United States Patent [19]
Motoshima et al.

[11] Patent Number: 5,760,949
[45] Date of Patent: Jun. 2, 1998

[54] LIGHT AMPLIFIER

[75] Inventors: Kuniaki Motoshima; Takashi Mizuochi; Katsumi Takano; Tadayoshi Kitayama, all of Tokyo, Japan

[73] Assignee: Mitsubishi Denki Kabushiki Kaisha, Tokyo, Japan

[21] Appl. No.: 706,611

[22] Filed: Sep. 5, 1996

[30]  Foreign Application Priority Data

Sep. 28, 1995 [JP] Japan ................... 7-251594

[51] Int. Cl.⁶ .................... G02B 6/26; H01S 3/00
[52] U.S. Cl. .................. 359/341; 359/343; 372/6
[58] Field of Search ................. 359/341, 343; 385/42, 48; 372/6

[56]  References Cited

U.S. PATENT DOCUMENTS

| | | | |
|---|---|---|---|
| 5,173,957 | 12/1992 | Bergano et al. | |
| 5,241,414 | 8/1993 | Giles et al. | |
| 5,367,587 | 11/1994 | Mizuochi et al. | 385/27 |
| 5,457,568 | 10/1995 | Jacobovitz-Veselka et al. | |
| 5,510,930 | 4/1996 | Motoshima et al. | |
| 5,563,732 | 10/1996 | Erdogan et al. | 359/341 |

FOREIGN PATENT DOCUMENTS

| | | |
|---|---|---|
| 5145194 | 6/1993 | Japan |
| 7211968 | 8/1995 | Japan |

OTHER PUBLICATIONS

C. R. Giles, T. Erdogan, and V. Mizrahi, "Simultaneous Wavelength–Stabilization of 980–nm Pump Lasers" IEEE Photonics Technology Letters, vol. 6, No. 8, Aug. 1994.

Yasuharu Suematsu "Semiconductor Laser and Integrated Circuit", Ohm, Inc.

C.R.Giles, T. Erdogan and V. Mizrahi "Simultaneous Wavelength–Stabilization of 980–nm Pump Lasers" IEEE Photonics Technology Letters, vol. 6, No. 8, Aug., 1994.

C.R.Giles, T. Erdogan and V. Mizrahi "Optical Amplifiers and Their Applications" Jul. 4–6, 1993 Yokohama, Japan, Optical Society of America & IEEE/Lasers and Electro–Optics Society Foundation of Semiconductor Laser Applied Physics Association, Ohm, Inc.

Mizouchi et al, Conf. Opt. Fiber Commun. vol. 8, Feb. 26, 1995; abst only herewith.

Mortan et al, Opt. Lett., vol. 19, #16, May 15, 1994, pp. 725–727.

Motoshima et al, IEEE Photo Technol. Lett. (USA), vol. 5, No. 12, pp. 1423–1426, Dec. 1993; abst. only herewith.

*Primary Examiner*—Nelson Moskowitz
*Attorney, Agent, or Firm*—Wolf, Greenfield & Sacks, P.C.

[57]  ABSTRACT

Reflectors each having a reflectance peak wavelength within a band of the wavelength characteristics of a laser amplification factor in the unsaturated state of each light source for excitation are provided between light sources for excitation and an optical coupler, and stable wavelength locking is effected by returning a portion of a small portion of excited light reflected by the reflectors into the light sources for excited light.

19 Claims, 18 Drawing Sheets

LIGHT AMPLIFIER

FIELD OF THE INVENTION

The present invention relates to a light amplifier using an optical fiber with a laser active substance, such as an rare earth element or a transition metal, used therein, and specifically to stabilization of excited light power in a redundant configuration in which a plurality of optical fiber amplifiers are excited by a plurality of light sources for excitation.

BACKGROUND OF THE INVENTION

An optical fiber amplifier has more desirable features such as that it does not depend on a transmission bitrate, that the optical repeaters can be simplified, and that a large transmission capacity can be realized with wavelength multiplexing, as compared to the conventional type of optical repeaters having the 3-R functions (Reshaping, Retiming, and Regenerating), and it is expected that the optical fiber amplifier will be applied to a wide range of applications from a submarine optical cable to a distributed type of optical subscriber system using an optical coupler. An optical fiber amplifier has generally a band width in the order of THz (terra hertz) and amplifies a large volume of data of G bit/s or more as an optical signal. Very high reliability is required for communication equipment carrying the large volume of data as described above, and it is extremely important to improve the reliability of a light source for excitation, which is the only active element specially used in an optical fiber amplifier.

However, a high output of 10 mW or more is generally required to a light source for excitation, and there is a limit in improvement of the light source itself. Also in a case where only one light source for excitation is used, when the light source for excitation is down, the line is cut off. To suppress generation of the state described above, a redundant configuration is employed in which a plurality of light sources for excitation are used.

As the light amplifier as described above, there is, for instance, the one disclosed in U.S. Pat. No. 5,173,957, and FIG. 15 is a view showing configuration of the conventional type of light amplifier described in the document above. In FIG. 15, designated at the reference numerals 1 and 2 is a light source for excitation respectively, at 3 an output stabilizing driving circuit for a light source for excitation, at 4 a 3-dB coupler, at 5 and 6 a wavelength multiplexer respectively, at 7 and 8 an optical fiber with rare earth material added therein respectively, at 9 and 12 a signal input terminal respectively, at 10 and 13 an optical isolator respectively, and at 11 and 14 a signal output terminal respectively.

Next, a description is made for operations thereof with reference to related drawings. The light sources 1, 2 each for excitation are driven so that a photo diode current for monitors each incorporated, for instance, in the light sources for excitation 1, 2 respectively will be kept at a constant level, and inputs an optical output, which is kept at a substantially constant level even if fluctuation in temperature or power voltage is generated, into the 3-dB coupler 4. When light waves not correlated to each other are inputted, the 3-dB coupler outputs power of each inputted light according to the desired characteristics to each output port by 50% respectively, and supplied an excited light via the wavelength multiplexers 5, 6 to the optical fibers 7, 8 with rare earth material added therein. Inversion distribution is formed due to this excited light in the optical fibers 7, 8 with rare earth material added therein, and a weak optical signal inputted from the signal input terminals 9, 12 is amplified with a specified degree of amplification and is outputted from the signal output terminals 11, 14. With this configuration, even if, for instance, the light source for excitation 1 is degraded and stops light emission, it can work depending on an excited light from the light source for excitation 2 with only 50% of excited light power of that in the normal operating mode, and reduction of a gain can be suppressed to a substantially low level by means of appropriate line designing for the system so that no problem will occur during practical operation.

What was described above relates to a case where the 3-dB coupler 4 operates as a 50% power distributor in the idealistic conditions. Namely, as the light sources for excitation 1 and 2 are discrete light sources by their nature, a phase in each light source fluctuates independently even if the frequencies in the two light sources are identical, and a branching ratio in the 3-dB coupler 4 averaged for a substantially longer time as compared to a coherence time for the light sources for excitation 1, 2 is kept at a constant level. Generally, a coherence time of a semiconductor laser used as a light source for excitation is 1 μs or less, and is fully smaller than the minimum value of 10 μs of a response time constant for fluctuation of excited light power in a erbium-doped optical fiber most commonly used as the optical fibers 7, 8 with rare earth material added therein.

For this reason, in an average obtained for a period of time higher than the response time constant for the optical fibers 7, 8 with rare earth material added therein, the excited light power is kept constant with the gain stabilized at a constant value. However, in a case where a light having the same frequency is inputted into the 3-dB coupler 4, a key component of the redundant configuration shown in FIG. 15, the branching ratio fluctuates depending on a phase relation between the two input light waves, and as a result a gain in each of the optical fibers 7, 8 with rare earth material added therein may change. In same cases the injection locking state may occur in which the light sources for excitation 1, 2 couple to each other due to the incomplete linearity of the 3-dB coupler 4 or reflection from a device connected to an output port of the 3-dB coupler and one of the light sources for excitation starts oscillation being excited by an oscillation frequency of the other light source. A phase relation between the light sources for excitation 1, 2 is kept for a period of time longer than the coherence time of a single light source.

FIG. 16 is a view showing a emission spectrum of the light source for excitation when the injection locking state has occurred. In this figure, designated at the reference numeral 101 is an emission spectrum of the light source for excitation 1 when the injection locking state has not been generated yet, at 103 an emission spectrum of the light source for excitation 1 when the injection locking has occurred, at 102 an emission spectrum of the light source for excitation 2, and at 104 an injection locking range of the light source for excitation 1 in a case where the light source for excitation 2 is a master laser. When a weak optical power from the light source for excitation 1 is coupled to the light source for excitation 2 and the oscillation frequencies f2, f1 get fully close to each other, as described, for instance, in the document ("Foundation of Semiconductor Laser" edited by Applied Physics Association, p. 58, Ohm Inc. (1987)), the light source for excitation 1 stops oscillation with the frequency f1, and starts output of a light beam with the frequency f2. This phenomenon is called injection locking. In this state, as shown in FIG. 16, a frequency of an injection light to the light source for excitation 1 coincides with that of an optical output of the light source for excitation 2, and a phase difference from −90 degrees to +90 degrees is kept depending on the frequency difference of f1–f2 between the two light waves before occurrence of the injection locking. For this reason, once the injection locking occurs, a branching ratio in the 3-dB coupler fluctuates depending on the phase difference between the light waves. And the injection locking is generated when the frequencies f1 and f2 satisfy the following relation:

$$|f_1 - f_2| < \Delta f \quad (1)$$

Herein the $\Delta f$ indicates the injection locking range, which is a value proportional to an electric field intensity of an injection light from the light source for excitation 2 inputted into the light source for excitation 1, and the value is expressed by the following equation:

$$\Delta f = \frac{\sqrt{\frac{P_i}{P_1}}(1 - R_1)}{4\pi \tau_p \sqrt{R_1}} \quad (2)$$

Herein Pi and P1 indicate an injection light power and a self-oscillation power inside the light source for excitation 1 respectively, τp indicates a life time of photon inside an oscillator in the light source for excitation 1, and R1 indicates a reflectance of a front surface of the light source for excitation 1. Generally in a high output semiconductor laser, a life time of photon τp is around 3 ps, and the front surface reflectance R1 is several percent. Assuming that the linearity in the 3-dB coupler 4 is 60 dB, the front surface reflectance is 3%, and a coupling loss between the laser and the fiber is 3-dB, the injection locking range Δf is 138 MHz. An emission spectrum line width in a high output semiconductor laser is around several MHz, which indicates that the probability of generation of injection locking is fairly high. FIG. 17 is a view showing the branching ratio fluctuation characteristics of a 3-dB coupler when the injection locking is generated, and in this figure the reference numerals 105, 106 indicates branching ratios of two output ports of the 3-dB coupler 4. Assuming that a phase difference between light waves inputted from the light sources for excitation 1, 2 is φ, branching ratios LA, LB for through port A and cross port B viewed from the light source for excitation 1 can be expressed by the following expressions:

$$L_A = \frac{1}{2}(1 - \sin\phi) \quad (3)$$

$$L_B = \frac{1}{2}(1 + \sin\phi) \quad (4)$$

As indicated by the expression (3), a branching ratio for the 3-dB coupler 4 when two light waves with a coherence there between are inputted, is a function of a phase difference φ between the light waves, and when φ is 90 degrees, all the light power is outputted from the port B, and when φ is −90 degrees, all the light power is outputted from the port A. The phase difference φ between the light waves is determined by a length L of a fiber connecting the light source for excitation 1, 3-dB coupler 4, and light source for excitation 2 together and a difference of self-oscillation frequencies f1–f2 between frequencies of the light sources for excitation 1, 2. The fiber length L is constant, but oscillation frequencies f1, f2 of the light sources for excitation 1, 2 change at random, which is a main cause for change of a phase difference φ between light waves. Because of the random change of the oscillation frequencies f1, f2, branching ratios 105, 106 for the output ports A, B show complementary random fluctuation characteristics. The random fluctuation of self-oscillation frequencies f1 and f2 include a very low frequency factor, and gain of the optical fibers 7, 8 with rare earth material added therein change in response to this low frequency factor. The gain change is characterized in that gains of the optical fibers 7, 8 with rare earth material added therein are always complementary.

As a method of suppressing the complementary gain change, a method can be considered in which mutual interference in the 3-dB coupler 4 is eliminated by lowering coherence in each of the light sources for excitation 1, 2. As an example of this type of configuration based on the conventional technology, there is, for instance, the one described in "Simultaneous Wavelength—Stabilization of 980 nm Pump Lasers", IEEE Photonics Technology Letter, pp. 907–909, VOL. 6, No. 8, 1994", and FIG. 18 is a view showing the conventional type of redundant configuration. In this figure, designated at the reference numeral 111 is a 4-port optical coupler, at 107 to 110 light sources for excitation, at 112 to 115 and 117 to 119 optical fibers, at 120 an optical fiber grating, and at 121 a anti-reflection terminator.

And an output light from the coupler 111 is injected through the optical fibers 117 to 119 into the EDF 1 to EDF 3 (erbium-doped optical fiber).

An object of this configuration is to improve the excitation efficiency in the optical fibers 7, 8 with rare earth material added therein by locking a light spectrum of a light source for excitation executing multi-mode oscillation in a reflection peak wavelength of an optical fiber grating 120 by means of reflection on the optical fiber grating 120.

FIG. 19 shows light spectra of the light sources for excitation 107 to 110 as well as absorption characteristics of the optical fibers 7, 8 with rare earth material added therein. Designated at the reference numerals 123, 125 is the absorption characteristics of the optical fiber with rare earth material added therein, at 122 an emission spectrum of each of the light sources for excitation 107 to 110 in a case where there is not the optical fiber grating 120 respectively, and at 124 an emission spectrum of each of the light sources for excitation 107 to 110 in a case where there is the optical fiber grating 120. Assuming that the optical fiber with rare earth material added therein to be used is an erbium-doped optical fiber and the excitation wavelength is 980 nm band, an absorption band in the optical fibers 7, 8 with rare earth material added therein (as shown in FIG. 15) is around 10 nm. In contrast, an emission spectrum of each of light sources for excitation 35 to 38 in a case where there is not the optical fiber grating 120 has a half band width of several nm in a semiconductor laser, so that several % to several tens % of the power is outside the absorption bands of the optical fibers 7, 8 with rare earth material added therein. Furthermore, in a semiconductor laser executing multi-mode oscillation, a power distribution among modes changes with time, due to such a phenomenon as mode hopping, so that the excited power within the absorption bands of the optical fibers 7, 8 with rare earth material added therein changes with time. For this reason, in a case where a multi-mode oscillating semiconductor laser is used, the excitation efficiency is lower as compared to an idealistic case, and also the excitation efficiency changes from time to time. Namely, gains in the optical fibers 7, 8 with rare earth material added therein change. In the emission spectrum 124 of each of the light sources for excitation 107 to 110 in a case where there is the optical fiber grating 120, the optical power is concentrated on the reflection peak wavelength due to the reflection characteristics of the optical fiber grating 120, so that the excitation efficiency is improved and also fluctuation of the excitation efficiency can substantially be suppressed.

When a peak reflectance of the optical fiber grating 120 is set to a value substantially equal to a front surface reflectance of a resonator in each of the light sources for excitation 107 to 110, an emission spectrum of the light sources 107 to 110 enters a state called coherent collapse where the coherence has dropped, and in spite of oscillation with the same wavelength, interference in the 4-port optical coupler 111 is eliminated, and the 4-port optical coupler 34 works as an idealistic power distributer. One of the problems in this configuration is fluctuation in an output from each of the light sources for excitation 107 to 110 which occurs when a lock for the emission spectrum in each of the light sources for excitation 107 to 110 is released due to reflection by the optical fiber grating 120. Each of the light sources for excitation 107 to 110 incorporates a light receiving element (abbreviated as monitor photodiode hereinafter) for monitoring a rear surface light from a semiconductor laser chip to stabilize output thereof. When an emission spectrum locking has occurred due to reflection by the optical fiber grating 120, an optical power received by a monitor photodiode is expressed by the following expression wherein $P_o$ is optical power outputted from each of the light sources for excitation 107 to 110, $R_1$ is a front surface reflectance, and $R_{FP}$ is a peak reflectance of the optical fiber grating 47:

$$P_{M=aPO} (R_1+R_{FP}) \quad (5)$$

Herein a is a proportion constant. However, when lock of an emission spectrum due to reflection by the optical fiber grating 120 has been released, the following expression is applicable.

$$P_M = aP_oR_1 \quad (6)$$

Generally the light sources for excitation 107 to 110 are driven so that an optical power $P_M$ received by the monitor photodiode will be constant, and it is understood from the expressions (5), (6) that the optical power $P_o$ in a case where wavelength locking has occurred is different from that in a case where the locking has been released. This causes a change of a gain in the optical fibers 7, 8 with rare earth material added therein. Whether emission spectrum locking due to reflection by the optical fiber grating 120 occurs or not is determined according to a reflectance $R_{FP}$ of the optical fiber grating 120 and an amplification factor in each of the light sources for excitation 107 to 110.

FIG. 20 is a view showing a relation in terms of wavelength characteristics between a laser gain in a light source for excitation and a reflectance of an optical fiber grating, and in this figure designated at the reference numerals 126, 127 is a wavelength characteristics of an equivalent front surface reflectance obtained by summing a reflectance of the optical fiber grating and a front surface reflectance of the light source for excitation respectively, at 128, 129 a laser amplification factor when the light source for excitation is not saturated respectively, and at 130, 131 a product of the equivalent front surface reflectance by the laser amplification factor when the light source for excitation is not saturated respectively, and as a rear surface reflectance in a general semiconductor laser is substantially 1, it is equal to a round trip gain in a laser resonator. Laser oscillation in the axial mode having the maximum power occurs when the round trip gain is for the maximum wavelength.

In FIGS. 20A, a wavelength $\lambda_1$ for which the laser amplification factor 128 in the unsaturated state becomes maximum is close to a wavelength $\lambda_2$ for which the equivalent front surface reflectance becomes maximum, and the round trip gain 130 becomes maximum at the wavelength $\lambda_2$ for which the equivalent front surface reflectance becomes maximum, namely at a wavelength for which a reflectance of the optical fiber grating becomes maximum. For this reason, in FIG. 20A, the light source for excitation starts oscillation, as desired, at a reflectance peak wavelength of the optical fiber grating. In contrast, in FIG. 20B, the wavelength $\lambda_1$ for which the laser amplification factor 129 in the unsaturated state, becomes maximum is distant from the wavelength $\lambda_2$ for which the equivalent front surface reflectance becomes maximum, so that the round trip gain 131 becomes maximum at the wavelength $\lambda_1$ for which the laser amplification factor 129 in the unsaturated state becomes maximum.

In this case, an oscillation wavelength in the axial mode having the maximum power in a light source for excitation coincides with an oscillation wavelength in a light source for excitation generated when there is not an optical fiber grating, and wavelength lock is not effected. A displacement of peak wavelength as described above between the laser amplification factor 129 in the unsaturated state and the equivalent front surface reflectance 127 can be generated, for instance, when the wavelength characteristics of the laser amplification factor 129 in the unsaturated state changes due to change in temperature. In a case of a semiconductor having a long wavelength band, the temperature characteristics for the gain peak wavelength is in a range from 0.3 to 0.4 nm/° C., and a full width at half maximum of the laser amplification factor in the unsaturated state is around 40 nm.

For the reasons as described above, even if reflectance peak wavelength of an optical fiber grating is adjusted to a peak wavelength for a laser amplification factor, in the unsaturated state, of a light source for excitation under a certain temperature, of the gain band when the temperature changes by around 50° C. In the example of conventional technology shown in FIG. 18, a plurality of light sources for excitation are wavelength-locked with the optical fiber grating 120, so that, in addition to displacement of a wavelength due to the temperature change as described above, also an effect by dispersion in the wavelength characteristics of the laser amplification factor in the unsaturated state in the light sources for excitation 107 to 110 is provided, and wavelength locking may easily be released.

As described above, in the redundant configuration of a light source for excitation in the conventional type of light amplifier, wavelength locking is effected by one piece of fiber grating, so that wavelength locking may easily be released due to such causes as temperature change, and as a result such problems as injection locking, change in an excited power, and change of gain in an light amplifier disadvantageously occur.

SUMMARY OF THE INVENTION

It is an object of the present invention to provide a light amplifier, in which reduction of coherence and stablilization of excited power can be achieved simultaneously by inserting into a transfer path for an excited light a plurality of reflectors each having a reflectance peak wavelength matched to a plurality of light sources for excitation forming redundant configuration.

A light amplifier according to the present invention comprises a plurality of an optical fiber with an active material added therein; a plurality of light sources each for excitation to oscillate an exited light for exciting the optical fiber; an optical coupler for synthesizing or dividing light waves to inject the excited light from the light source for excitation into the optical fiber; a wavelength multiplexer for injecting an output light from the optical coupler into the optical fiber;

and a reflector having the wavelength characteristics with one or a plurality of reflectance peaks connected to and provided between the light source for excitation and the optical coupler.

A light amplifier according to the present invention comprises an optical fiber with an active material added therein; a plurality of light sources each for excitation to oscillate an exited light for exciting the optical fiber; an optical coupler for synthesizing or dividing light waves to inject the excited light from the light source for excitation into the optical fiber; a wavelength multiplexer for injecting an output light from the optical coupler into the optical fiber; and reflectors each having a different wave length selectivity provided and connected to between the optical coupler and the wavelength multiplexer.

A light amplifier according to the present invention comprises an optical fiber with an active material added therein; a plurality of light sources each for excitation to oscillate an exited light for exciting the optical fiber; an optical coupler for synthesizing or dividing light waves to inject the excited light from the light source for excitation into the optical fiber; a wavelength multiplexer for injecting an output light from the optical coupler into the optical fiber; and reflectors each connected to an input terminal or an output terminal of the optical fiber and having the different wave length selectivity.

A light amplifier according to the present invention comprises an optical fiber with an active material added therein; a plurality of light sources each for excitation to oscillate an exited light for exciting the optical fiber; an optical coupler having polarization preserving characteristics for synthesizing or dividing light waves of the excited light from the light source for excitation; a wavelength multiplexer for injecting an output light from the optical coupler into the optical filer; an optical fiber for adjusting a plane of polarization of an excited light from the light source for excitation for polarization characteristics of the optical coupler; and a reflector provided in the output side of the optical coupler and having the reflectance peak characteristics with polarization dependency.

A light amplifier according to the present invention comprises an optical fiber with an active material added therein; a plurality of light sources each for excitation to oscillate an exited light for exciting the optical fiber; an optical coupler for synthesizing or dividing light waves to inject the excited light from the light source for excitation; an optical wavelength multiplexer for injecting an output light from the optical coupler into the optical fiber; a reflector receiving a back light generated by the light source for excitation; a light-electric current conversion element for converting the back light having passed through the reflector to an electric current; and an stabilizing driving circuit for supplying a stabilizing drive current to the light source for excitation according to an output from the light-electric current conversion element.

Other objects and features of this invention will become understood from the following description with reference to the accompanying drawings.

DESCRIPTION OF THE PREFERRED EMBODIMENTS

Figure 1:
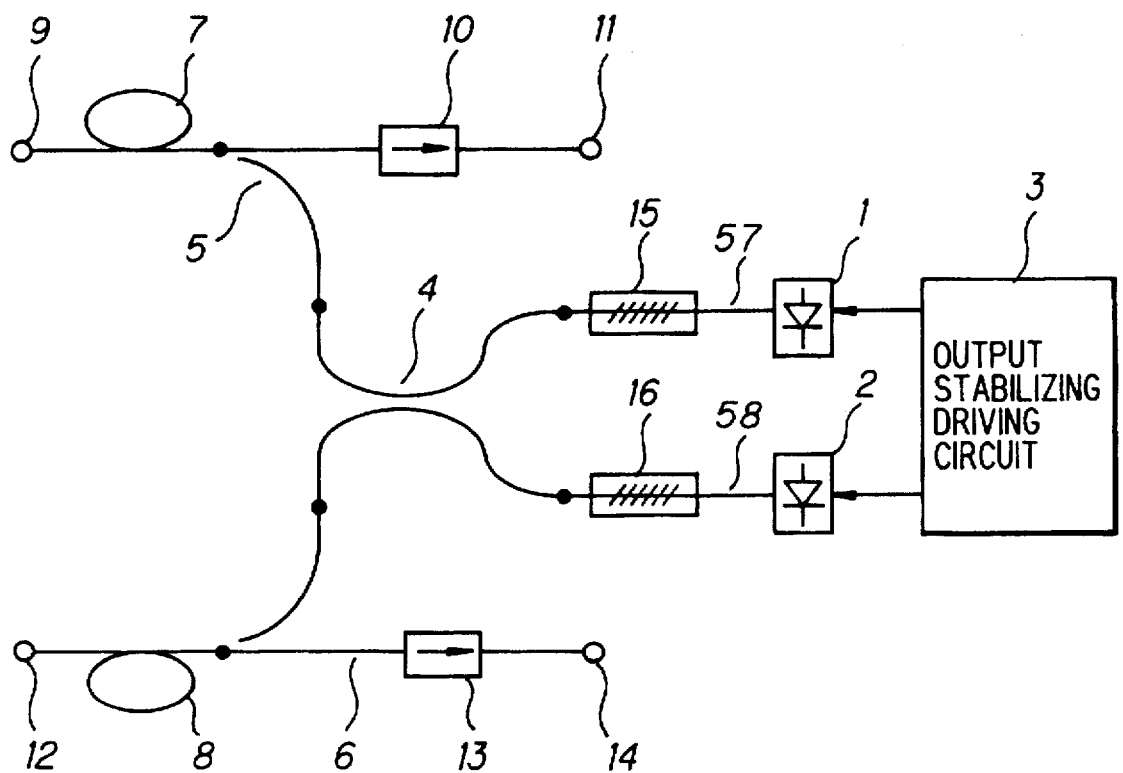
FIG. 1 is a view showing configuration of a light amplifier according to a first embodiment of the present invention.
Figure 2:
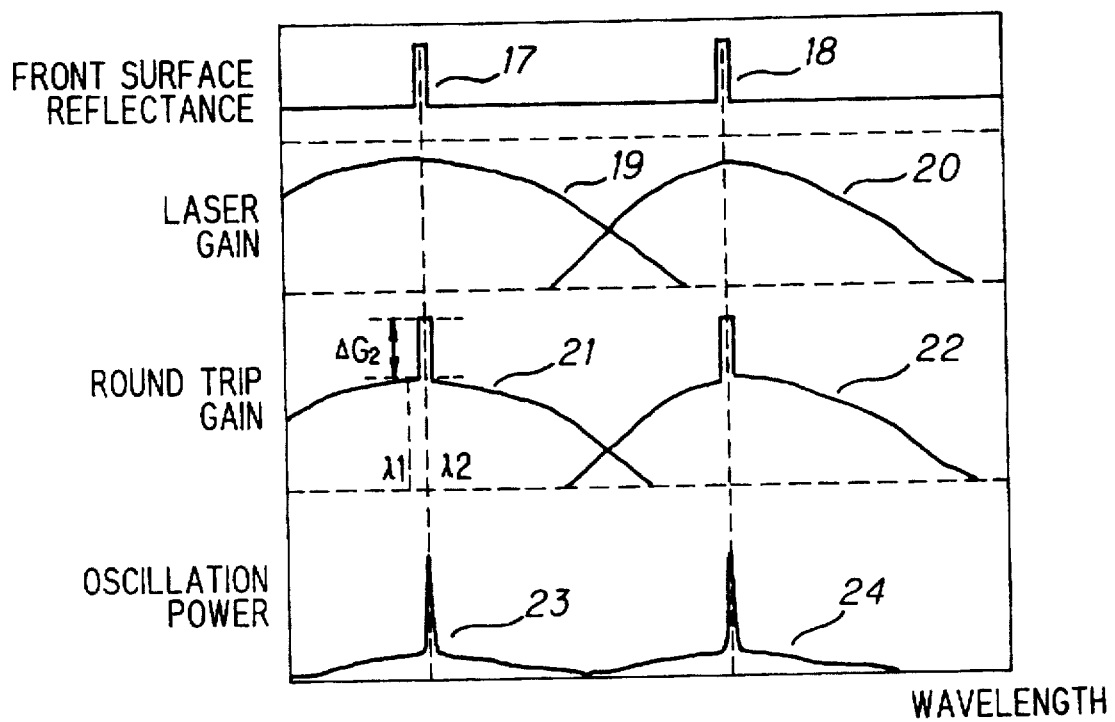
FIG. 2 is a view showing the wavelength characteristics of a laser amplification factor when light sources for excitation 1, 2 are not saturated, and reflectance wavelength characteristics and oscillation characteristics of reflectors 15 and 16 according to the first embodiment.

FIG. 1 is a view showing configuration of a light amplifier according to a first embodiment of the present invention, and the reference numerals 15, 16 indicate a reflector having a reflectance peak in the peak wavelength of laser amplification factor when light sources for excitation 1, 2 are not saturated respectively. The same reference numerals are assigned to the portions corresponding to those in an example based on the conventional technology. FIG. 2 is a view showing the wavelength characteristics of the laser amplification factor when the light sources for excitation 1, 2 are not saturated and the reflectance wavelength characteristics as well as oscillation characteristics of the reflectors 15 and 16. In the figure, designated at the reference numerals 17, 18 is an equivalent front surface reflectance of the light sources for excitation 1, 2 respectively, at 19, 20 a laser amplification factor when the light sources for excitation 1, 2 are not saturated respectively, at 21, 22 a round trip gain, at 23, 24 a oscillation power from the light sources for excitation 1, 2, respectively.

Description is made for operations in this embodiment. The reflectors 15, 16, in this case, are inserted into between a 3-dB coupler 4 and the light sources for excitation 1, 2. The equivalent front surface reflectance 17 of the light source for excitation 1 becomes a sum of the front surface reflectance of a laser chip and the reflectance of the reflector 15 because effect over the reflector 16 is suppressed normally by more than 60 dB due to linearity isolation between input ports of the 3-dB coupler 4. The reflector 15 has a reflectance peak wavelength $\lambda_2$ close to the peak wavelength $\lambda 1$ of the laser amplification factor when the light source for excitation 1 is not saturated. The equivalent front surface reflectance 18 of the light source for excitation 2 has also a reflectance peak wavelength close to the peak wavelength of the laser amplification factor when the light source for excitation 1 is not saturated. For this reason, round trip gains 21 and 22 of the light sources for excitation 1, 2 obtain peak values in the reflectance peak wavelength in the reflectors 15, 16 respectively, and oscillation powers 23, 24 have the wavelengths locked stably, and then the power concentrates onto the reflectance peak wavelength from the reflectors 15, 16 respectively. Reflectance peak wavelengths from the reflectors 15, 16 are, as shown described above, independently set close to the peak wavelength of the laser amplification factor when the light sources for excitation 1, 2 are not saturated, so that the tolerance against temperature and aging effect of the laser amplification factors 19, 20 when the light sources for excitation 1, 2 are not saturated can be made larger, which makes it possible to realize stable wavelength locking over a prolonged period.

Although the above description assumes a case where the reflectors are inserted to both of the light sources for excitation 1, 2, but the reflector 15 may be inserted only to the light source for excitation 1. Namely, with the reflector 15, an optical output from the light source for excitation 1 eliminates coherence, and as a result it does not interfere with an output light from the light source for excitation 2, thus a branching ratio of the 3-dB coupler 4 being stabilized. In this case, a reflectance peak wavelength of the reflector 15 is set close to a peak wavelength of the laser amplification factor when light source for excitation 1 is not saturated, and for this reason a stable wavelength lock can be achieved.

Also the above description assumes a case where the reflectors 15 and 16 have a single reflectance peak wavelength, but by making the reflectors have a plurality of reflectance peak wavelengths, it is possible to expand a wavelength area in which wavelength locking can be executed, and also to expand a range of peripheral temperature for the light sources for excitation 1, 2.

Figure 3:
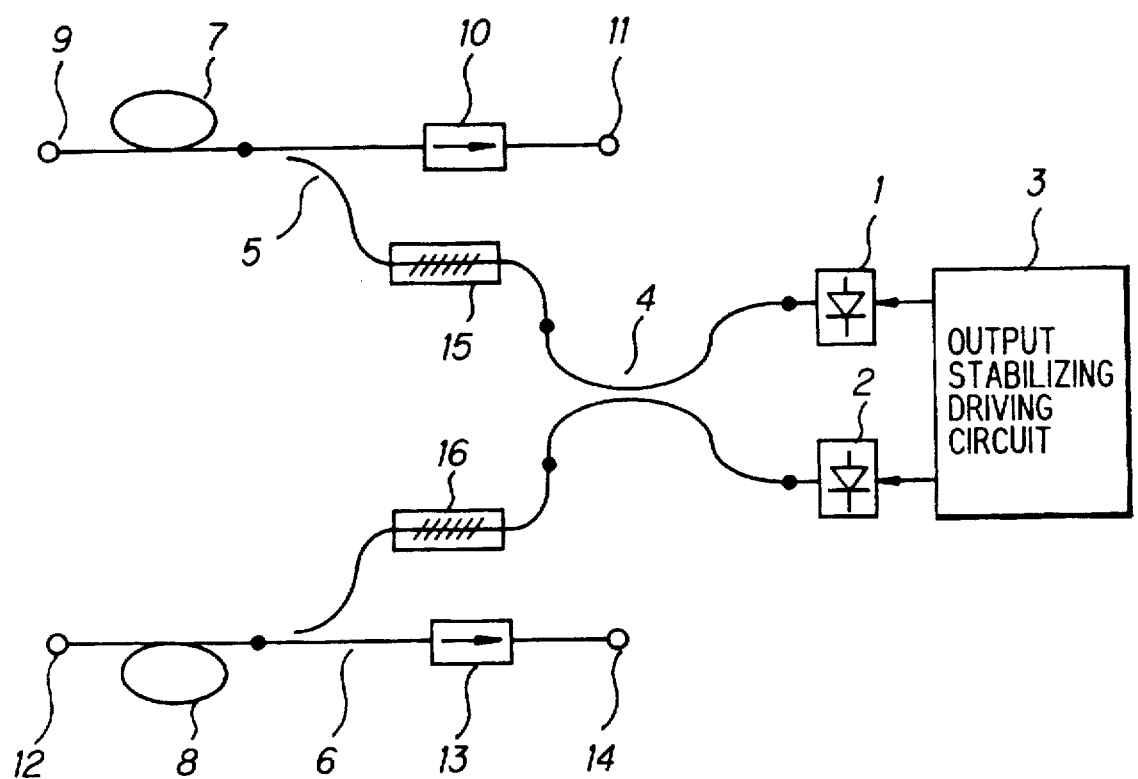
FIG. 3 is a view showing configuration of a light amplifier according to a second embodiment of the present invention.

FIG. 3 is a view showing configuration of a light amplifier according to a second embodiment of the present invention, and the reflectors 15 , 16 are inserted between the 3-dB coupler 4 and the optical fibers 7, 8 with rare earth material added therein. The reflectors 15, 16 in this embodiment are the ones which reflect a slight portion of a particular wavelength of injected light wave and allows the most of the injected light wave to pass therethrough, and the reflectance peak wavelength is in the peak wavelength of the laser amplification factor when the light sources for excitation 1, 2 are not saturated.

Next description is made for operations in this embodiment. A slight portion of an excited light from the light sources for excitation 1, 2 is reflected on the reflectors 15, 16, and the most of the light passes therethrough and enters the 3-dB coupler 4. The reflected excited light returns to the light sources for excitation 1, 2 to lock the oscillation wavelength.

Figure 4:
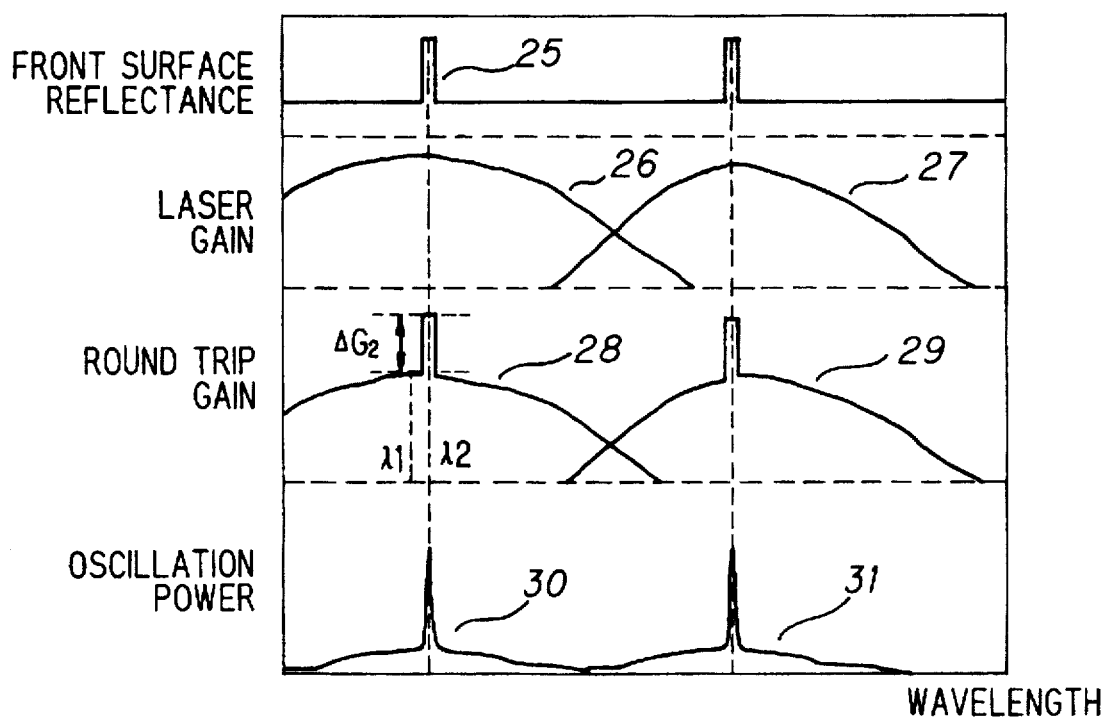
FIG. 4 is a view showing the wavelength characteristics of a laser amplification factor when light sources for excitation 1, 2 are not saturated, and reflectance wavelength characteristics and oscillation characteristics of the reflectors 15 and 16 according to the second embodiment.

A description is made for the wavelength lock with reference to FIG. 4. FIG. 4 is a view showing the wavelength characteristics of the laser amplification factor when the light sources for excitation 1, 2 are not saturated, and wavelength characteristics of an equivalent front surface reflectance as well as oscillation characteristics in a case where peak wavelengths of the laser amplification factor when the light sources for excitation 1, 2 are not saturated are separated largely from each other. In the figure, designated at the reference numerals 25, 26 is an equivalent front surface reflectance of the light sources for excitation 1, 2 respectively, at 27, 28 a laser amplification factor when the light sources for excitation 1, 2 are not saturated respectively, at 29, 30 round trip gains in the light sources for excitation 1, 2, and at 31, 32 oscillation powers for the light sources for excitation 1, 2. The equivalent front surface reflectance 25 of the light source for excitation 1 becomes a sum of the average value of the front surface reflectance in a laser chip of the light source for excitation 1 and those of the reflectors 15, 16 because the light injected into the 3-dB coupler 4 is synthesized or distributed, and has two peaks corresponding to peak reflectance wavelengths of the reflectors 15, 16. The equivalent front surface reflectance 26 of the light source for excitation 2 also has the wavelength characteristics identical to that of the light source for excitation 1 assuming that the front surface reflectance of a laser chip is identical to the light source for excitation 1. Round trip gains 29, 30 for the light sources for excitation 1, 2 have peaks in the reflectance peak wavelength of the reflectors 15, 16 respectively because the two of peak wavelength of the laser amplification factor when the light sources for excitation 1, 2 are not saturated are separated largely from each other, and for this reason it is possible to ignore the effect due to two equivalent front surface reflectance peaks.

For this reason, as for oscillation powers 31, 32, like in FIG. 2, the light source for excitation 1 has the wavelength characteristics locked in a reflection peak wavelength from the reflector 15, and the light source for excitation 2 has that locked in a reflection peak from the reflector 16.

Figure 5:
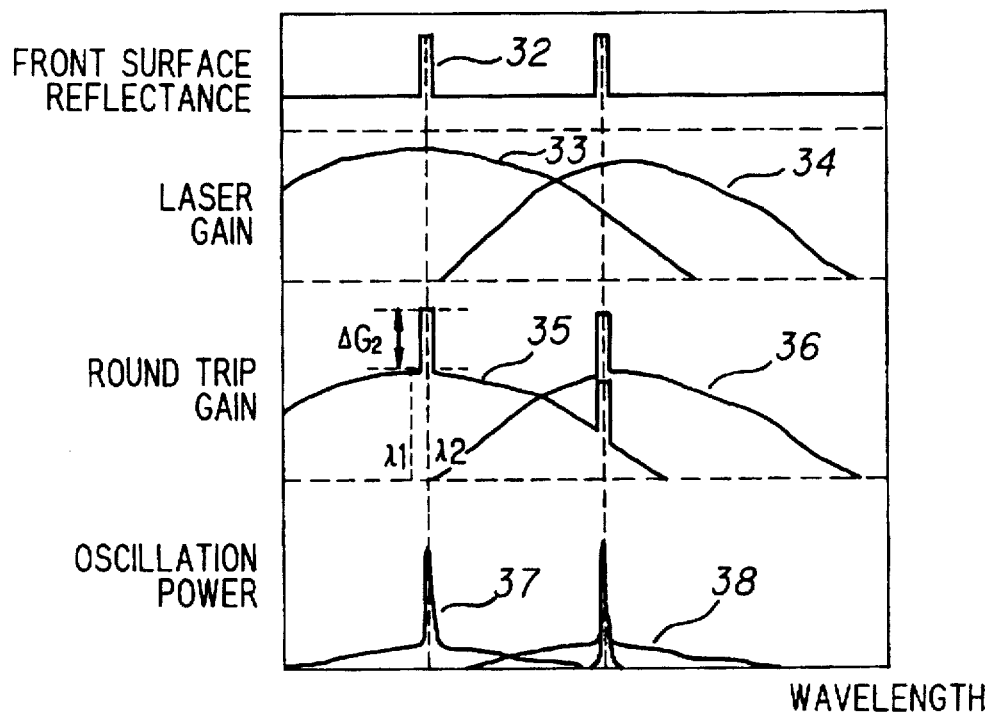
FIG. 5 is a view showing the wavelength characteristics of a laser amplification factor when light sources for excitation 1, 2 are not saturated, and reflectance wavelength characteristics and oscillation characteristics of the reflectors 15 and 16 according to the second embodiment.

FIG. 5 is a view showing the wavelength characteristics of the laser amplification factor when the light sources for excitation 1, 2 are not saturated, wavelength characteristics of an equivalent front surface reflectance, and oscillation characteristics, in a case where the two peak wavelength of the laser amplification factor when the light sources for excitation 1, 2 are not saturated are close to each other. In the figure, designated at the reference numeral 33 is an equivalent front surface reflectance of the light sources for excitation 1, 2, at 34, 35 a laser amplification factor when the light sources for excitation 1, 2 are not saturated respectively, at 36, 37 a round trip gain in the light sources for excitation 1, 2, respectively, at 38, 39 an oscillation power for the light sources for excitation 1, 2, respectively. In this case, the round trip gains 36, 37 for the light sources for excitation 1, 2 have two peaks in the waveform because two peaks wavelength of the laser amplification factor 34, 35 are close to each other, and in consideration of effect of spatial inhomogeneity in an inverted distribution in the laser medium such as spatial hole burning, wavelength distribution itself of the oscillation powers 38, 39 may have two peaks. An important factor herein is a ratio between a front surface light and a back surface light in a case where oscillation is executed with two wavelengths like in a case of the oscillation power 38 for the light source for excitation 1, and if this value is not changed, an output light from the light source for excitation 1 is kept constant by means of an output stabilizing driving circuit 3.

Figure 6:
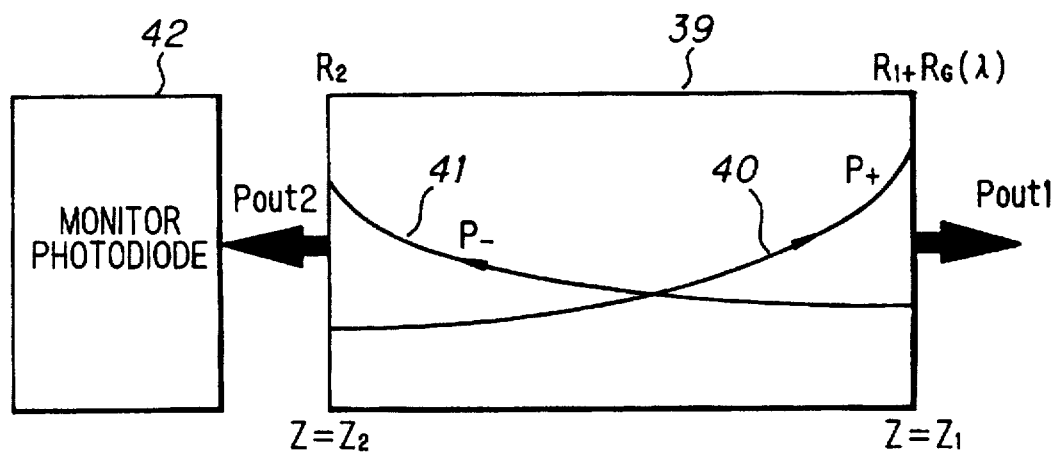
FIG. 6 is a view showing an amplifying process of a light wave inside the light source for excitation 1.

To make clear a relation between the ratio of the front surface light vs rear surface light and a laser parameter, a process to amplify a light inside the light source for excitation 1 shown in FIG. 6 is considered below. In the figure, designated at the reference numeral 39 is a laser chip, at 40 power distribution of a forward progressive wave, at 41 power distribution of a backward progressive wave, at 42 a monitor photodiode for receiving power $P_{out2}$ of a portion of the backward progressive wave to convert it to an electric current and for inputting it to the output stabilizing driving circuit 3. It is assumed that $R_1$ indicates a front surface reflectance of a laser chip and $R_2$ indicates a rear surface reflectance thereof. The power distribution $P_+$ of the forward progressive wave and the power distribution $P_-$ of the backward progressive wave satisfy the following differential equation.

$$\frac{dp_+(z)}{dz} = +\alpha(z)P_+(z) \quad (7)$$

$$\frac{dP_-(z)}{dz} = -\alpha(z)P_-(z) \quad (8)$$

Herein $\alpha$ (z) indicates gain coefficient (nep/m) in an oscillation wavelength.

$$P_+(Z_1) = P_+(Z_2) \times e^G \quad (9)$$

$$P_-(Z_2) = P_-(Z_1) \times e^G \quad (10)$$

however, $$G = \int_{z_2}^{z_1} \alpha(z) dz$$

The following expression is obtained from the expressions (9) and (10).

$$P_+(Z_1) = P_+(Z_2)e^G = R_2 P_-(Z_2)e^G = R_2 P_-(z_1)e^G = R_2 R_1 P_+(Z_1)e^{2G} \quad (11)$$

From the expression (11), the expression : $e^G = (R1\ R2)^{-1/2}$ is obtained, from which an expression indicating the normal oscillating conditions can be derived. From the expression described above, a front surface optical power P out 1 and a rear surface optical power P out 2 are expressed by the following expression:

$$\frac{P_{out1}}{P_{out2}} = \frac{(1-R_1)P_+(z_1)}{(1-R_2)P_-(z_2)} = \frac{(1-R_1)P_+(z_1)}{(1-R_2)P_+(z_1)R_1 e^G} = \quad (12)$$

$$\frac{(1-R_1)\sqrt{R_2}}{(1-R_2)\sqrt{R_1}}.$$

It is understood from the expression (12) that the ratio between the front surface light and rear surface light depends on only the front surface reflectance $R_1$ and the rear surface reflectance $R_2$, and has nothing to do with the gain coefficient a(z). Accordingly, the expression (12) can satisfy a multi-mode oscillation caused by spatial inhomogeneity of inverted distribution in the laser medium such as spatial hole burning, and if the front surface reflectance as well as the rear surface reflectance in each axial mode are obtained, a ratio between a front surface optical power and a rear surface optical power is determined. From this consideration, the front surface optical power can be kept at a constant level so long as equivalent front surface reflectance in an oscillating axial mode is kept at a constant level. An equivalent front surface reflectance is $R1+R_G/2$ ($R_G$ is a peak reflectance of the reflectors 15, 16) in a reflectance peak wavelength in the reflectors 15 and 16, and a sum of the two axis modes can be kept at a constant level. For this reason an excited power in a case of oscillation in the two axis modes is equal to an excited power in a case of oscillation in a single axis mode.

As described above, an excited power with no APC error under stable conditions can be obtained even in a case where peak wavelengths of the laser amplification factor when the light sources for excitation 1, 2 are not saturated are close to each other.

Figure 7:
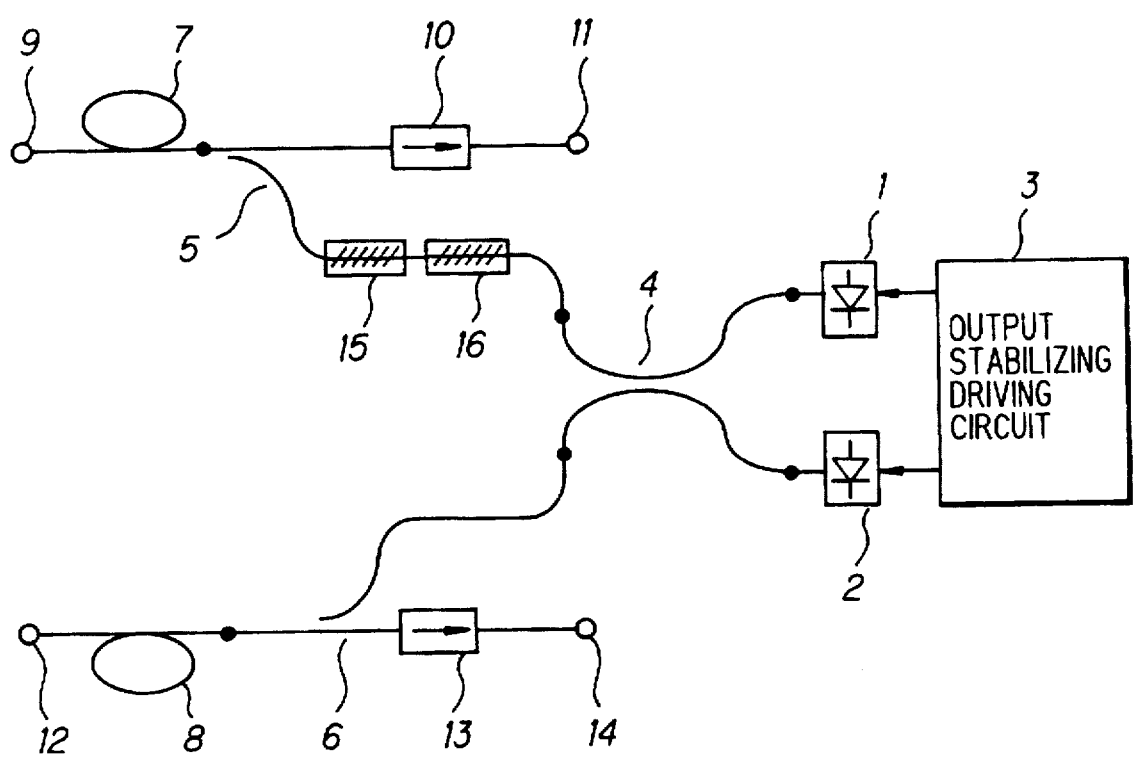
FIG. 7 is a view showing another example of the configuration of a light amplifier according to the second embodiment.

The description above assumes a case where the reflectors 15, 16 are connected to each output port of the 3-dB coupler 4, but even if the reflectors 15, 16 are connected to the same output port as shown in FIG. 7, equivalent front surface reflectance viewed from the light sources for excitation 1, 2 are identical, which makes it possible to obtain the same effect as that described above.

Figure 8:
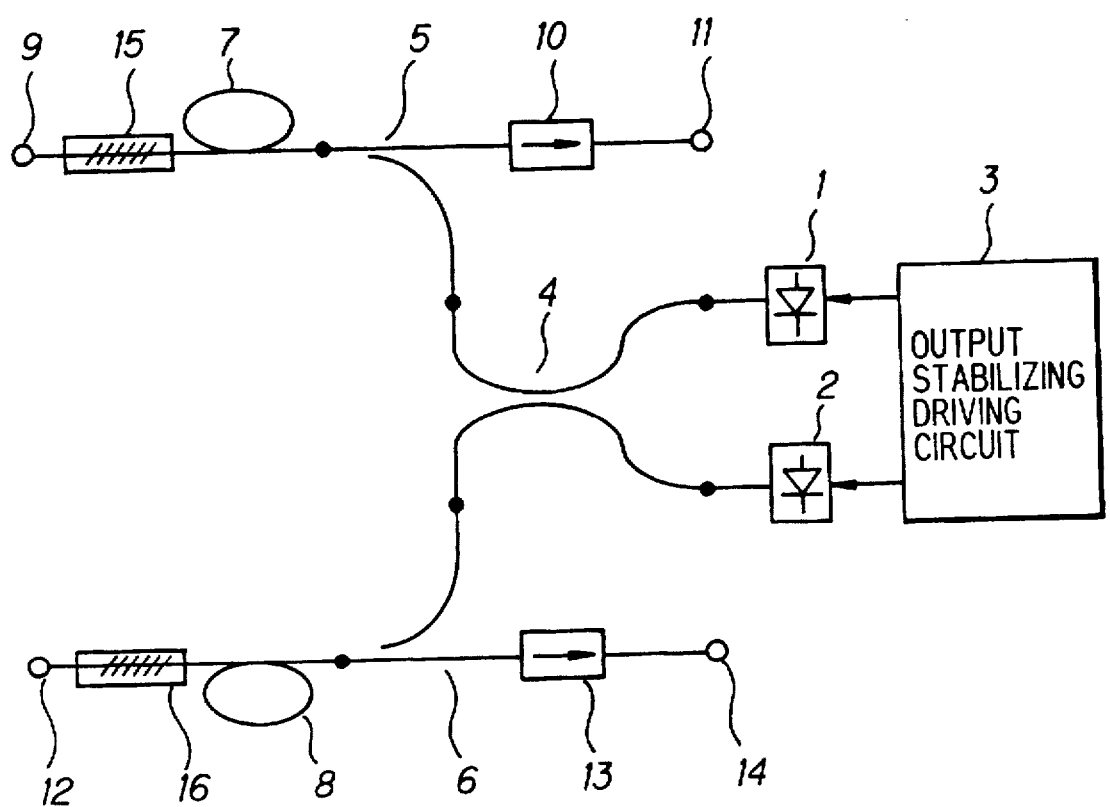
FIG. 8 is a view showing configuration of a light amplifier according to a third embodiment.

FIG. 8 is a view showing configuration of a light amplifier according to Embodiment 3 of the present invention, and reflectors 15, 16 are connected to input points of the optical fibers 7, 8 with rare earth material added therein respectively. Also reflectance peak wavelengths for the reflectors 15, 16 are set to values close to a peak wavelength of a laser amplification factor when the light sources for excitation 1, 2 are not saturated respectively.

Next, a description is made for operations in this embodiment. Generally an excited light inputted into the optical fibers 7, 8 with rare earth material added therein is not absorbed by 100%, and in a case of the backward excitation as shown in FIG. 8, the excited light leaks from an input point to a transfer path. The reflectors 15, 16 again input the excited light leaked as described above into the optical fibers 7, 8 with rare earth material added therein for improving the excitation efficiency, and the excited light is inputted via the wavelength multiplexers 5, 6 and the 3-dB coupler 4 into the light sources for excitation 1, 2, thus wavelength locking being achieved. Reflectance peak wavelengths for the reflectors 15, 16 can independently be set to values each close to a peak wavelength of a laser amplification factor when the light sources for excitation 1, 2 are not saturated respectively, so that, as described in relation to Embodiment 2 of the present invention, oscillation is executed at either one of or both the reflectance peak wavelengths of the reflectors 15, 16, so that a stable light output can be supplied to the optical fibers 7, 8 with rare earth material added therein. It is necessary to set the peak reflectance for the reflectors 15, 16 to high values taking into account absorption of excited light in the optical fibers 7, 8 with rare earth material added therein, but it is possible to return the excited light leaked from an input point into a transfer path efficiently into the optical fibers 7, 8 with rare earth material added therein by setting the reflectance to a high value. For instance, even if a peak reflectance for each of the reflectors 15, 16 is set to 1 (total reflection), no problem would occur. Although the above description assumes a light amplifier excited backward, in a light amplifier excited forward, it is only required to connect a reflector to a signal output point, and then the same effect can be achieved.

Figure 9:
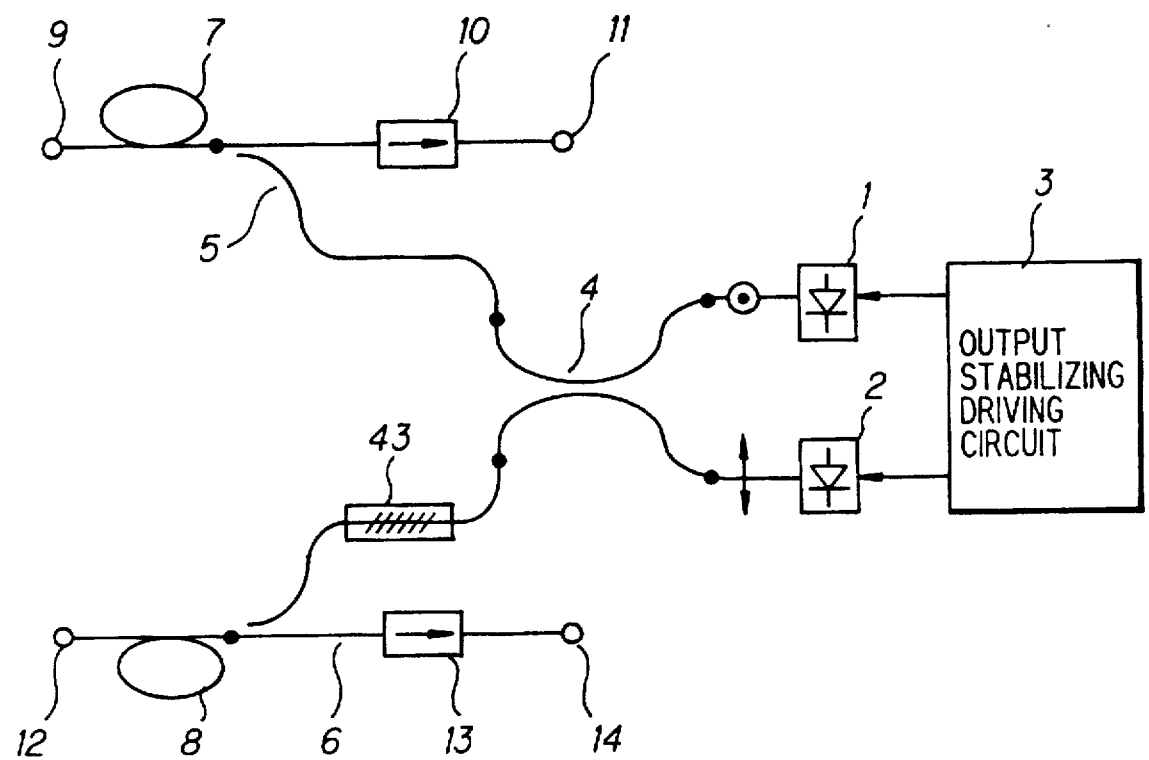
FIG. 9 is a view showing configuration of a light amplifier according to a fourth embodiment.

FIG. 9 is a view showing configuration of a light amplifier according to Embodiment 4 of the present invention, and it is assumed that the 3-dB coupler has the polarization preserving characteristics, and light waves generated from the light sources for excitation 1, 2 are inputted with linear polarization aligned to two different specific polarization axes. A reflector 43 is one in which the wavelength characteristics of reflectance has dependency on polarization, and the reflector has a peak reflectance at different wavelengths against two types of linear polarization crossing each other at right angles. By making use of the polarization dependency of reflectance peak wavelength, as described in relation to the second embodiment, it is possible to realize with one reflector 43 the configuration in which the reflectance peak wavelength coincide with a peak wavelength of the laser amplification factor when the light sources for excitation 1, 2 are not saturated.

Figure 10:
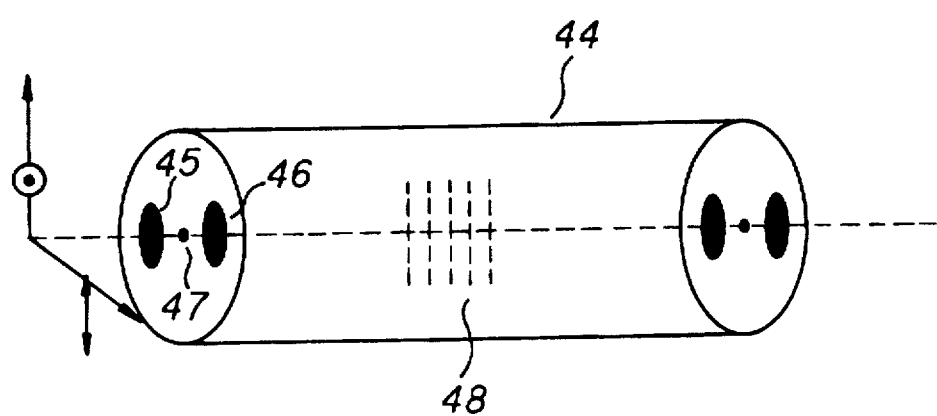
FIG. 10 is a view showing configuration of a reflector using a polarization preserving optical fiber.
Figure 11:
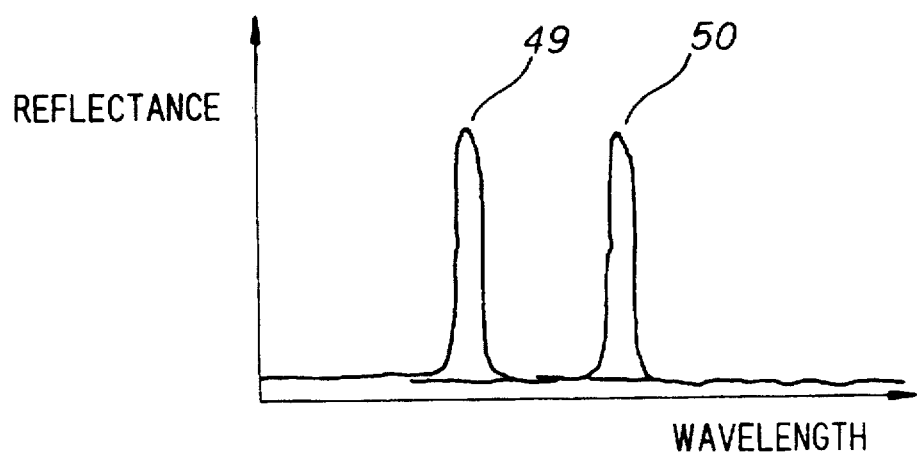
FIG. 11 is a view showing the wavelength characteristics of a reflectance against two orthogonally polarized lights in a case where reflection characteristics having wavelength selectivity are given to a polarization preserving optical fiber.

FIG. 10 shows, as an example, construction of a reflector using a polarization preserving optical fiber therein, and the reflector has a bragg reflection structure based on an optically induced change in the refractive index to realize the reflection characteristics with wavelength selectivity in the polarization preserving optical fiber. In this figure, designated at the reference numeral 44 is a polarization preserving optical fiber, at 45, 46 a stress loading section, at 47 a core, and at 48 a bragg reflection section. The polarization preserving optical fiber 44 generates with a stress generated by the stress loading sections 45, 46 in the core section 47 a difference in an equivalent refractive index between linear polarization parallel to the stress and linear polarization perpendicular to the stress to give a propagation constant difference $\Delta\beta$. FIG. 11 shows the wavelength characteristics of reflectance against two types of polarization crossing each other at right angles in a case where reflection characteristics with wavelength selectivity is given to a polarization preserving optical fiber. In this figure, the reference numerals 49, 50 indicate reflectance against linear polarization parallel to the slow axis and that parallel to the fast axis respectively. The polarization dependency $\Delta\lambda_g$ of a reflectance peak wavelength in a bragg reflection section due to the propagation constant difference Db can be expressed by the following equation:

$$\Delta\lambda_g = 2(\Delta n)d = 2\frac{\Delta\beta}{k_0} d \quad (13)$$

Herein $\Delta n$, d, and $k_0$ indicates an equivalent refractive index against two types of polarization crossing each other at right angles, a grating pitch in a bragg reflection section, and a number of waves of a reflected wavelength in vacuum. The expression (13) can be summarized according to the expressions of $d=\lambda_g/2n$ and $k_0=2\pi/\lambda_g$ as shown below.

$$\Delta\lambda_g = \frac{\Delta\beta}{2n\pi} \lambda_g^2 \quad (14)$$

Assuming herein that $\lambda_g$ is 1480 nm, which is a general excited wavelength, n is 1.5, which is a typical value for an optical fiber, and the propagation constant difference $\Delta\beta$ is 100,000 rad/m, the polarization dependency $\Delta\lambda_g$ of the reflectance peak wavelength is 24 nm. As described in relation to the example of conventional technology, a full width at half maximum of a laser amplification factor in the unsaturated state of a semiconductor laser is around 40 nm, and wavelength locking for light sources for excitation 1, 2 is possible where the polarization dependency $\Delta\lambda_g$ of a reflectance peak wavelength is 24 nm and 3-dB band for a laser amplification factor in the unsaturated state of the two light sources are not overlapped.

Figure 12:
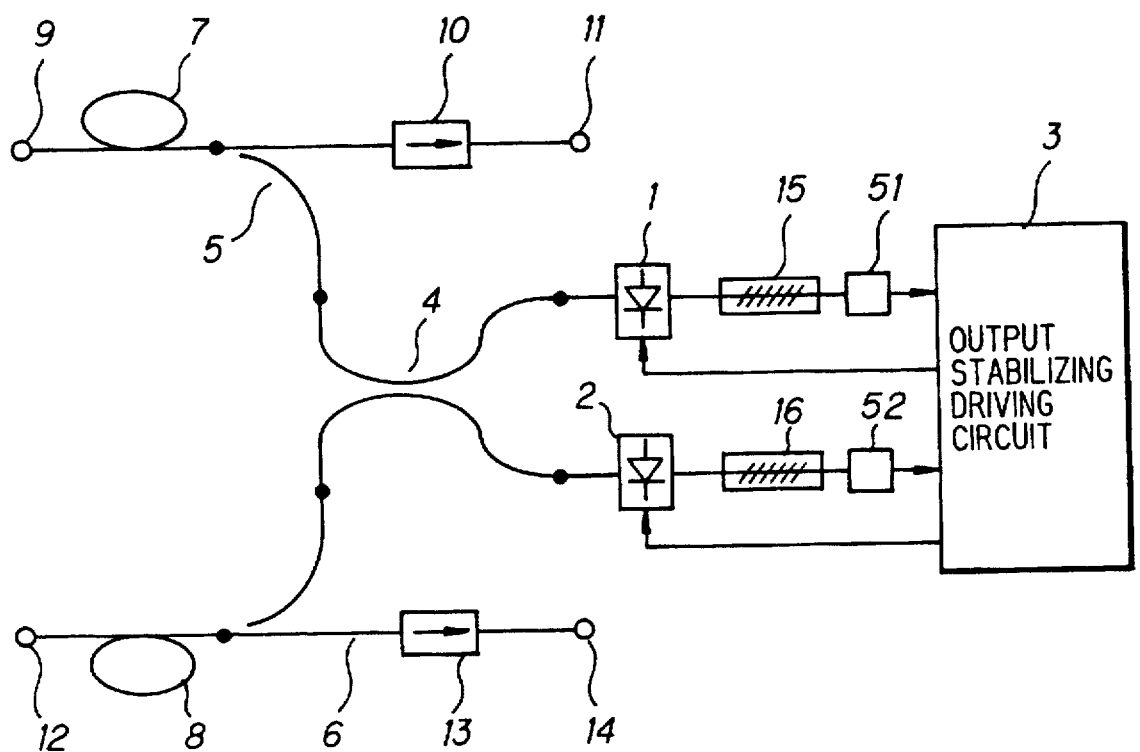
FIG. 12 is a view showing configuration of a light amplifier according to a fifth embodiment of the present invention.

FIG. 12 is a view showing configuration of a light amplifier according to Embodiment 5 of the present invention, and in this figure designated at the reference numerals 51, 52 is a light receiving element respectively. A rear surface light generated from the light sources for excitation 1, 2 is introduced into the reflectors 15, 16.

Next, a description is made for operations in this embodiment. Generally a rear surface of a semiconductor chip in each of the light sources for excitation 1, 2 has a high reflectance of around 90%, and is driven by a output stabilizing driving circuit 3 so that a constant excited light will be outputted by monitoring a very small quantity of leaked light. In FIG. 12, A light reflectance on a rear surface of the semiconductor chip is realized with the reflectors 15, 16, and stable oscillation wavelength-locked to the reflectance peak wavelength is possible. Light slightly leaked from the reflectors 15, 16 is converted by the light receiving elements 51, 52 to an electric current and is outputted to the output stabilizing driving circuit 3, thus normal APC driving being enabled.

Figure 13:
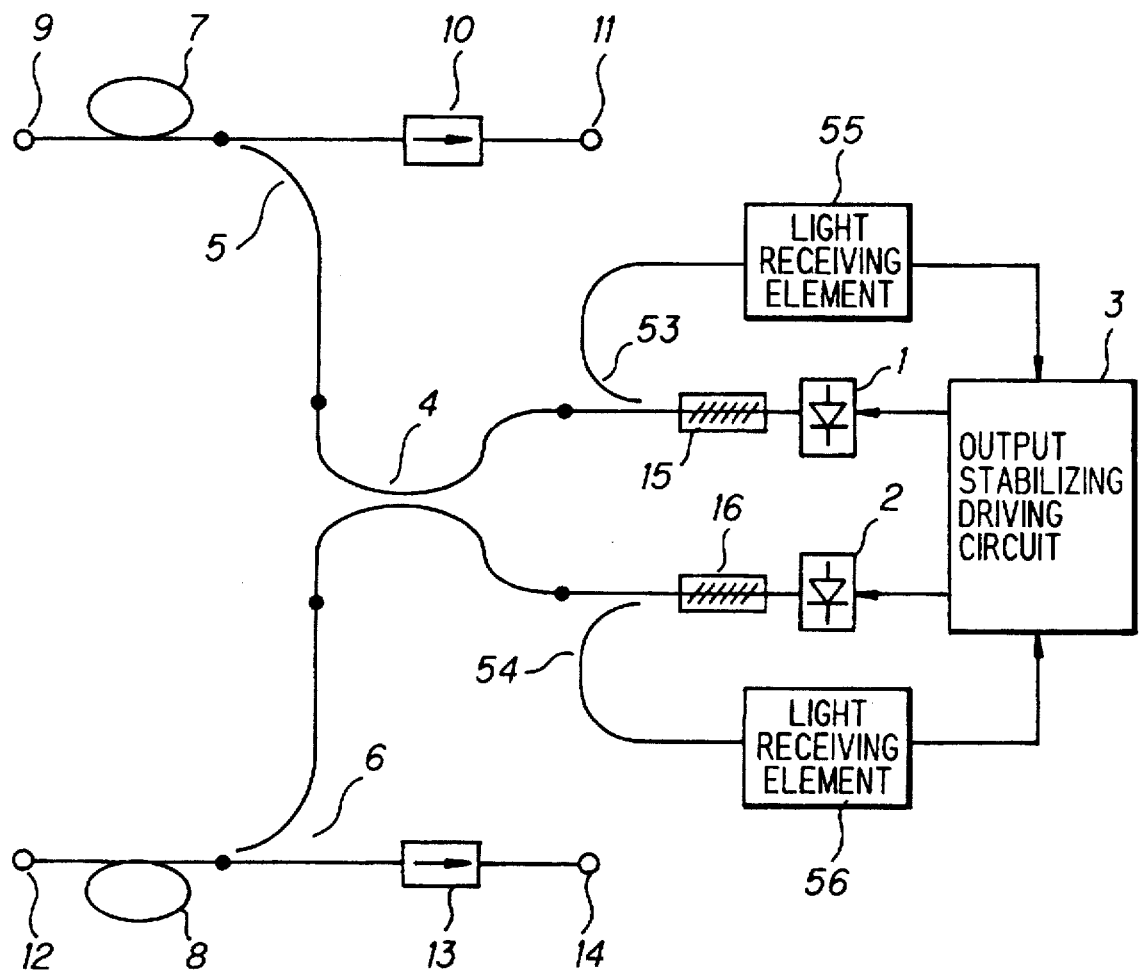
FIG. 13 is a view showing configuration of a light amplifier according to a sixth embodiment of the present invention.

FIG. 13 is a view showing configuration of a light amplifier according to Embodiment 6 of the present invention, and in this figure, designated at the reference numerals 53, 54 is a coupler for monitoring respectively, and at 55, 56 s light receiving element respectively.

Next, a description is made for operations in this embodiment. The light sources for excitation 1, 2 respectively output a low coherence excited light with the oscillation wavelength locked to the reflectance peak wavelength of each of the reflectors 15, 16. The couplers for monitoring 53, 54 respectively input a portion of the excited light inputted into the 3-dB coupler 4. The output stabilizing driving circuit 3 controls a drive current for the light sources for excitation 1, 2 so that a current outputted from the light receiving elements 55, 56 will be kept at a constant level. In this configuration, it is possible as a principle to eliminate the temperature characteristics of a front surface light/rear surface light which causes problems in the ordinary rear surface light monitoring system, and an APC control error due to fluctuation of a front surface light coupling loss, which in turn makes it possible to substantially stabilize a gain in a light amplifier.

Figure 14:
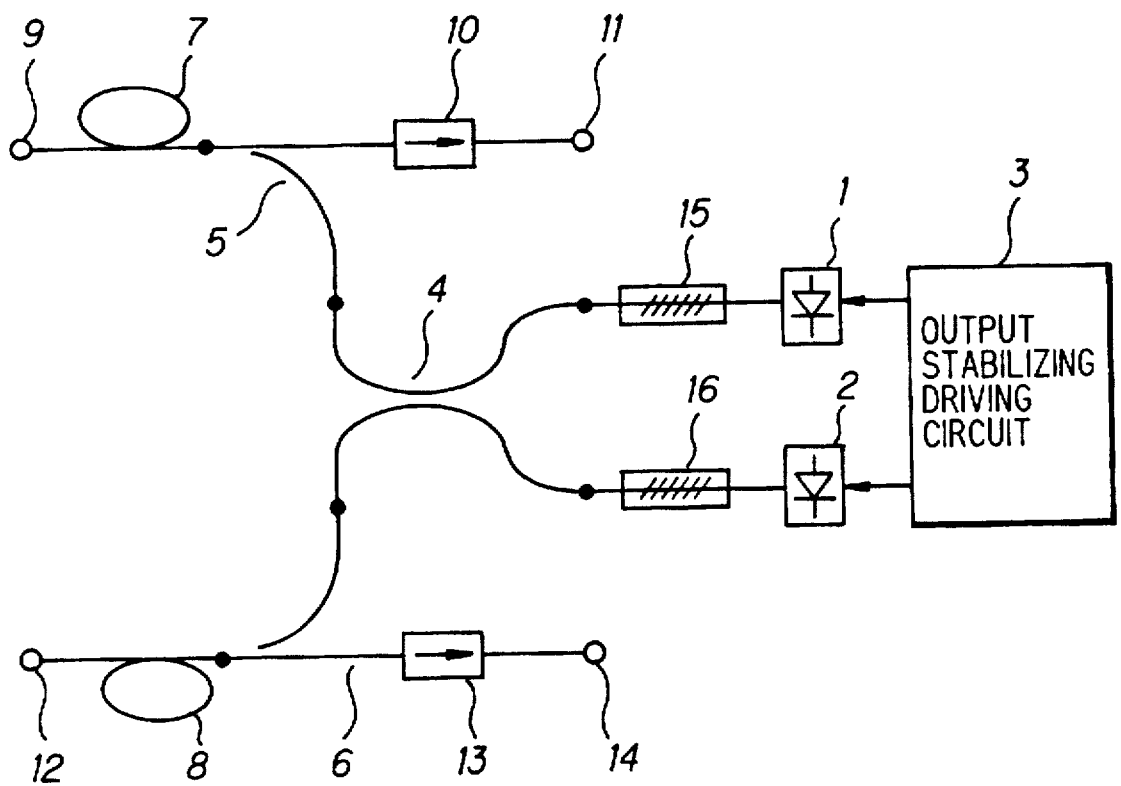
FIG. 14 is a view showing configuration of a light amplifier according to a seventh embodiment of the present invention.
Figure 15:
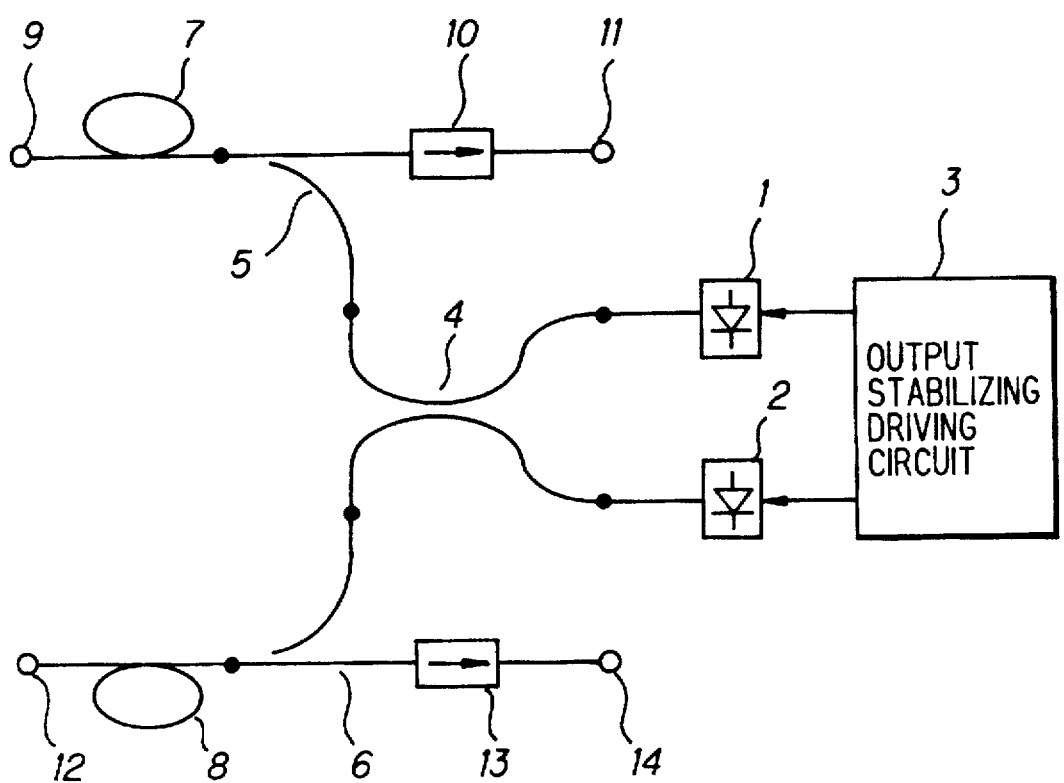
FIG. 15 is a view showing configuration of a light amplifier based on the conventional technology.
Figure 16A:
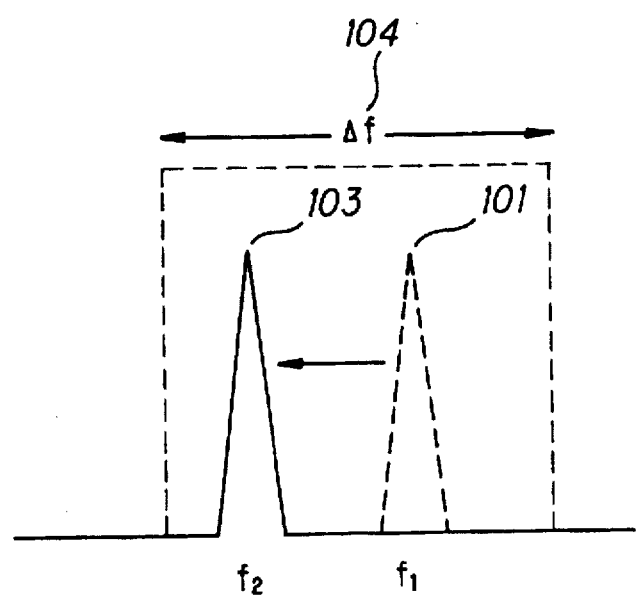
FIGS. 16A and 16B are views for explanation of injection locking.
Figure 16B:
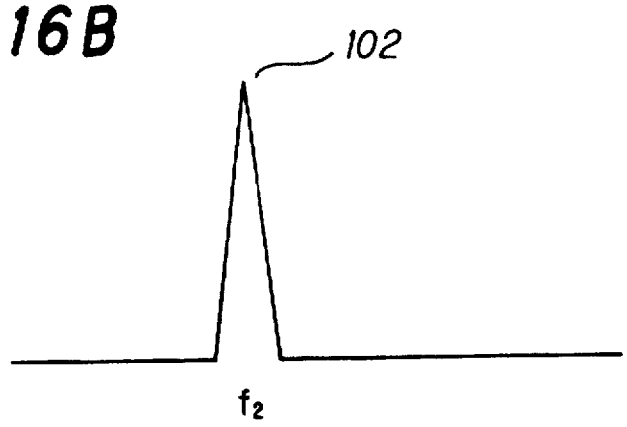
Figure 17:
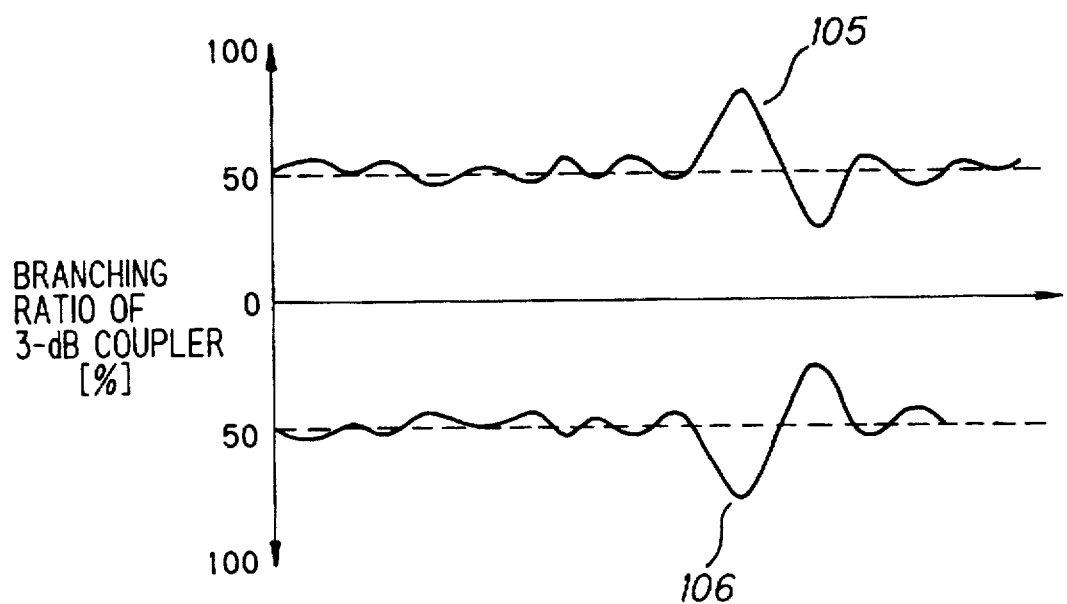
FIG. 17 is a view showing a branching ratio of a coupler.
Figure 18:
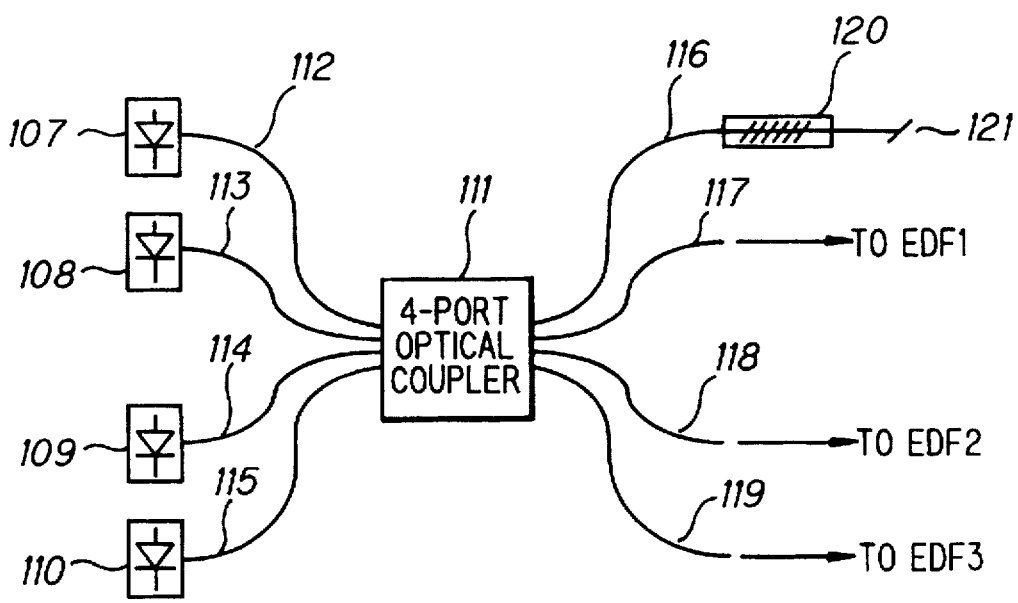
FIG. 18 is a view showing configuration of another light amplifier based on the conventional technology.
Figure 19A:
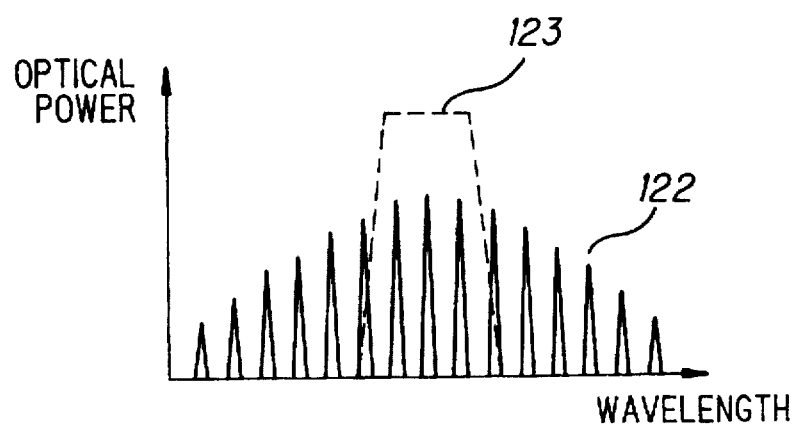
FIGS. 19A and 19B are views showing a spectrum of a light source for excitation and wavelength absorption characteristics of an optical fiber.
Figure 19B:
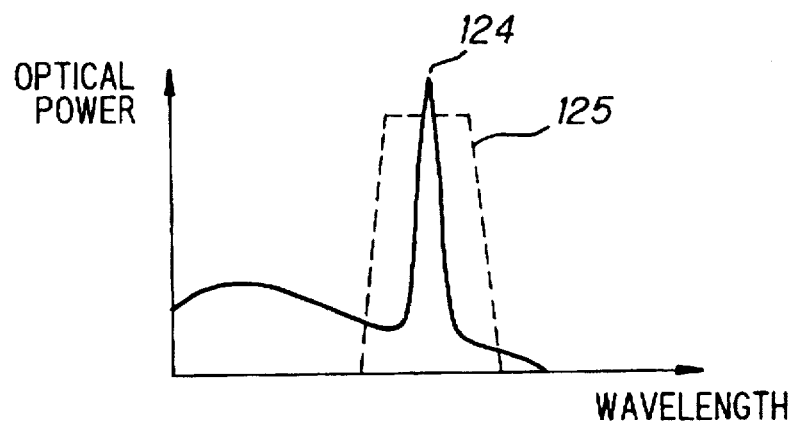
Figure 20A:
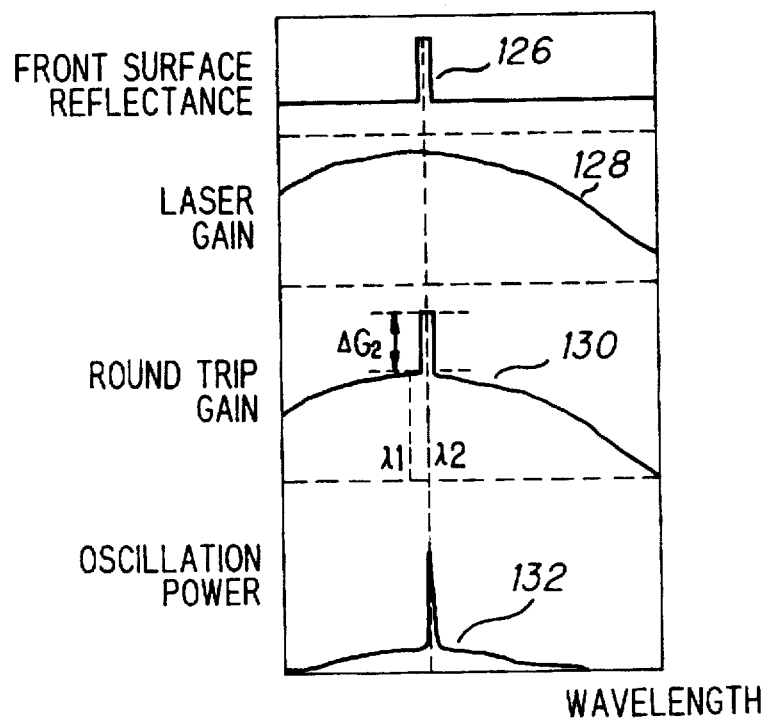
FIGS. 20A and 20B are views showing a relation between a laser gain in the light source for excitation and wavelength characteristics of the reflectance of an optical fiber grating.
Figure 20B:
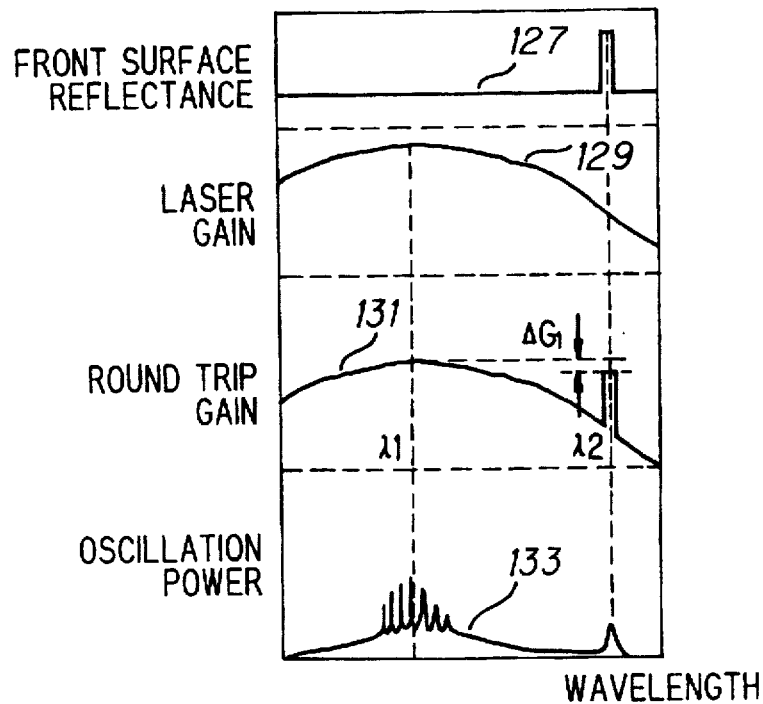

FIG. 14 is a view showing configuration of a light amplifier according to Embodiment 7 of the present invention, and an object of the embodiment is to suppress fluctuation of polarization in a resonator formed with the light sources for excitation 1, 2 and the reflectors 15, 16. In this figure the reference numerals 57, 58 indicate a polarization preserving optical fiber respectively.

Next, a description is made for operations in this embodiment. Outputs from the light sources for excitation 1, 2 are introduced into the polarization preserving optical fibers 57, 58 in parallel to the specific polarization axis respectively. Because of this feature, even in a case where the light amplifier vibrates, outputs from the light sources for excitation 1, 2 are introduced into the reflectors 15, 16 preserving the linear polarization under stable conditions. The reflectors 15, 16 preserve polarization of the introduced light, and reflect a portion thereof to introduce it into the light sources for excitation 1, 2. Because of this feature, a light coming out of the light sources for excitation 1, 2 and a light introduced thereinto are kept in the same linearly polarized state, so that a polarized state of a light propagating in a resonator formed with the back of reflectors 15, 16 and the light sources for excitation 1, 2 can be kept at a constant polarized state with the round trip gain stabilized to the maximum value. Because of the features as described above, an oscillation wavelength of a light wave generated from a light source for excitation and an optical output power can be stabilized. FIG. 14 shows a case where the reflectors 15, 16 are inserted between the 3-dB coupler 4 and the light sources for excitation 1, 2, but in a case where the reflectors are connected between the optical fibers 7, 8 with rare earth material added therein and the 3-dB coupler 4, the same effect can be achieved by using the 3-dB coupler 4 having the polarization preserving characteristics.

As described above, with the present invention, by inserting into a transfer path for an excited light a plurality of reflectors each having a reflectance peak wavelength matched to a plurality of light sources for excitation forming redundant configuration, reduction of coherence and stabilization of excited power can be achieved simultaneously.

This application is based on Japanese patent application No. HEI 7-251594 filed in the Japanese Patent Office on Sep. 28, 1995, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A light amplifier comprising:

an optical fiber with a laser active material added therein;

a plurality of light sources, each for producing an oscillating excitation light which excites the laser active material, and having a difference end corresponding reflectance and gain peak;

an optical coupler for combining light waves of the excitation light produced by each of the light sources;

a wavelength multiplexer for injecting an output light from said optical coupler into said optical fiber; and a plurality of reflectors provided between said plurality of light sources and said optical coupler, each reflector having a wavelength reflectance characteristics corresponding to a front surface reflectance peak of a corresponding one of the light sources.

2. A light amplifier according to claim 1 comprising:

an optical branch unit for branching an excited power inputted into said optical coupler;

a convertor for subjecting the output light from said optical branch unit to light-electric current conversion; and a control means for controlling a drive current of the light sources so that an output current from said convertor is kept at a constant level.

3. A light amplifier according to claim 1, wherein transfer paths for the excitation light from the light sources to the corresponding reflectors are formed with an optical fiber having polarization preserving characteristics.

4. A light amplifier according to claim 1; wherein a fiber grating is used as a reflector having wavelength selectivity characteristics matched to the plurality of light sources.

5. A light amplifier comprising:

an optical fiber with a laser active material added therein;

a plurality of light sources, each for producing an oscillating excitation light which excites the laser active material and having a different, corresponding reflectance and gain peak;

an optical coupler for combining light waves of the excitation light produced by each of the light sources;

a wavelength multiplexer for injecting an output light from said optical coupler into said optical fiber; and a plurality of reflectors provided between said optical coupler and said wavelength multiplexer, each reflector having a different wavelength selectivity corresponding to a front surface reflectance peak of one of the light sources.

6. A light amplifier according to claim 5 comprising:

an optical branch unit for branching an excited power inputted into said optical coupler;

a convertor for subjecting the output light from said optical branch unit to light-electric current conversion; and a control means for controlling a drive current of the light sources so that an output current from said convertor is kept at a constant level.

7. A light amplifier according to claim 5, wherein transfer paths for the excitation light from the light sources to the corresponding reflectors are formed with an optical fiber having polarization preserving characteristics.

8. A light amplifier according to claim 1; wherein a fiber grating is used as a reflector having wavelength selectivity characteristics matched to the plurality of light sources.

9. A light amplifier comprising:

an optical fiber with a laser active material added therein;

a plurality of light sources, each for producing an oscillating excitation light which excites the laser active material and having a different corresponding reflectance and gain peak;

an optical coupler for combining light waves of the excitation light produced by each of the light sources;

a wavelength multiplexer for injecting an output light from said optical coupler into said optical fiber; and a plurality of reflectors each connected to an input terminal or an output terminal of said optical fiber and having a different waveform selectivity corresponding to a front surface reflectance peak of one of the light sources.

10. A light amplifier according to claim 9 comprising:

an optical branch unit for branching an excited power inputted into said optical coupler;

a convertor for subjecting the output light from said optical branch unit to light-electric current conversion; and a control means for controlling a drive current of the light sources so that an output current from said convertor is kept at a constant level.

11. A light amplifier according to claim 9, wherein transfer paths for the excitation light from the light sources to the reflectors are formed with an optical fiber having polarization preserving characteristics.

12. A light amplifier according to claim 9; wherein a fiber grating is used as a reflector having wavelength selectivity characteristics matched to the plurality of light sources.

13. A light amplifier comprising:

an optical fiber with a laser active material added therein;

a plurality of light sources, each for producing an oscillating excitation light which excites the laser active material and having a different corresponding reflectance and gain peak;

an optical coupler for combining light waves of the excitation light produced by each of the light sources;

a wavelength multiplexer for injecting an output light from said optical coupler into said optical fiber; and a reflector provided in at the output of said optical coupler and having reflectance peak characteristics with polarization dependency corresponding to front surface reflectance peaks of the plurality of light sources.

14. A light amplifier according to claim 13, wherein a transfer path for the excitation light from the light sources to the reflector is formed with an optical fiber having polarization preserving characteristics.

15. A light amplifier according to claim 1; wherein a fiber grating is used as a reflector having wavelength selectivity characteristics matched to the plurality of light sources.

16. A light amplifier according to claim 13; wherein a grating formed by making use of an optically induced reflectance change phenomenon on a polarization plane preserving fiber is used as a reflector having the polarization dependency.

17. A light amplifier comprising:

an optical fiber with a laser active material added therein;

a plurality of light sources, each for producing an oscillating excitation light which excites the laser active material;

an optical coupler for combining light waves of the excitation light produced by each of the light sources;

a wavelength multiplexer for injecting an output light from said optical coupler into said optical fiber; and a reflector receiving a back light generated by said light source;

a light-electricity conversion element for converting the back light having passed through said reflector to an electric current; and a stabilizing driving circuit for supplying a stabilizing drive current to said light sources according to an output from said light-electric current conversion element.

18. A light amplifier according to claim 17, wherein a transfer path for the excitation light from the light sources to the reflector is formed with an optical fiber having polarization preserving characteristics.

19. A light amplifier according to claim 1; wherein a fiber grating is used as a reflector having wavelength selectivity characteristics matched to the plurality of light sources.

* * * * *